(12) United States Patent
Choi et al.

(10) Patent No.: US 12,496,165 B2
(45) Date of Patent: Dec. 16, 2025

(54) CLEAR ALIGNMENT ATTACHMENT DESIGN METHOD AND CLEAR ALIGNERS

(71) Applicant: OSSTEM IMPLANT CO., LTD., Seoul (KR)

(72) Inventors: Kyoo Ok Choi, Seoul (KR); Ga Young Jung, Bucheon-si (KR)

(73) Assignee: OSSTEM IMPLANT CO., LTD., Seoul (KR)

( * ) Notice: Subject to any disclaimer, the term of this patent is extended or adjusted under 35 U.S.C. 154(b) by 217 days.

(21) Appl. No.: 18/281,423

(22) PCT Filed: May 9, 2022

(86) PCT No.: PCT/KR2022/006527
§ 371 (c)(1),
(2) Date: Sep. 11, 2023

(87) PCT Pub. No.: WO2022/245028
PCT Pub. Date: Nov. 24, 2022

(65) Prior Publication Data
US 2024/0156570 A1    May 16, 2024

(30) Foreign Application Priority Data
May 18, 2021   (KR) .................. 10-2021-0064079

(51) Int. Cl.
*A61C 7/00*   (2006.01)
*A61B 34/10*  (2016.01)

(52) U.S. Cl.
CPC .............. *A61C 7/002* (2013.01); *A61B 34/10* (2016.02); *A61B 2034/107* (2016.02); *A61C 2007/004* (2013.01)

(58) Field of Classification Search
CPC ....................................................... A61C 7/002
USPC ........................................................... 433/24
See application file for complete search history.

(56) References Cited

U.S. PATENT DOCUMENTS

| 9,375,300 | B2 | 6/2016 | Matov et al. |
| 10,258,431 | B2 | 4/2019 | Hong |
| 2013/0122448 | A1* | 5/2013 | Kitching ................. A61C 7/08 433/24 |
| 2013/0204583 | A1 | 8/2013 | Matov et al. |
| 2016/0302885 | A1* | 10/2016 | Matov ................... A61C 7/002 |

(Continued)

FOREIGN PATENT DOCUMENTS

| EP | 3 533 411 A1 | 9/2019 |
| KR | 10-1200014 B1 | 11/2012 |

(Continued)

OTHER PUBLICATIONS

International Search Report No. PCT/KR2022/006527 Issued on Aug. 17, 2022, (3 Pages in Korean).

(Continued)

*Primary Examiner* — Sunil K Singh
(74) *Attorney, Agent, or Firm* — NSIP Law (57) ABSTRACT

A clear alignment attachment design method and clear aligners are disclosed. A clear alignment attachment design method and clear anglers, according to one embodiment, display and provide, on individual teeth, as identifiable visual information, whether an additional attachment needs to be attached during clear alignment, and thus can improve teeth-straightening speed and accuracy.

15 Claims, 7 Drawing Sheets

(56) References Cited

U.S. PATENT DOCUMENTS

| | | | |
|---|---|---|---|
| 2017/0231721 A1* | 8/2017 | Akeel | A61C 7/002 433/24 |
| 2017/0265967 A1 | 9/2017 | Hong | |
| 2018/0303581 A1 | 10/2018 | Martz et al. | |
| 2023/0255726 A1* | 8/2023 | Yan | G16H 20/30 433/24 |

FOREIGN PATENT DOCUMENTS

| | | |
|---|---|---|
| KR | 10-2014-0128407 A | 11/2014 |
| KR | 10-1518710 B1 | 5/2015 |
| KR | 10-1838992 B1 | 3/2018 |
| KR | 10-1884138 B1 | 8/2018 |
| KR | 10-1891289 B1 | 8/2018 |
| KR | 10-2019-0077849 A | 7/2019 |
| KR | 10-2020-0113449 A | 10/2020 |
| KR | 10-2021-0047487 A | 4/2021 |
| WO | WO 2021/074828 A1 | 4/2021 |

OTHER PUBLICATIONS

Korean Office Action issued on Oct. 13, 2023, in counterpart Korean Patent Application No. 10-2021-0064079 (2 pages in Korean).
Extended European search report issued on Jan. 21, 2025, in counterpart European Patent Application No. 22804883.1 (11 pages).

* cited by examiner

CLEAR ALIGNMENT ATTACHMENT DESIGN METHOD AND CLEAR ALIGNERS

CROSS REFERENCE TO RELATED APPLICATIONS

This application is a U.S. National Stage Application of International Application No. PCT/KR2022/006527, filed on May 9, 2022, which claims the benefit under 35 USC 119(a) and 365(b) of Korean Patent Application No. 10-2021-0064079, filed on May 18, 2021, in the Korean Intellectual Property Office, the entire disclosure of which is incorporated herein by reference for all purposes.

TECHNICAL FIELD

The present invention relates to orthodontic technology, and more particularly to orthodontic technology using clear aligners.

BACKGROUND ART

One of the orthodontic treatment methods is the use of wires. Orthodontic treatment with wires is a fast and effective correction method using the force (elasticity) of the wire material, and by attaching brackets together, corrective force is provided in the planned direction. With the advancement of technology, functions have been added to brackets, allowing for orthodontic correction using only brackets without the use of wires. There are also various types of brackets available for use in orthodontic correction.

While bracket technology has advanced sufficiently, patients have come to prefer treatment methods that are not only technically sound but also aesthetically pleasing. As a result, the number of patients choosing clear orthodontic treatment has increased, and to address the issue of diminished corrective force, clear alignment attachments are being used as alternatives to brackets. However, these attachments are still limited in terms of available types and quantities compared to brackets. Additionally, due to the limited form of attachments based on tooth movement, it is challenging to precisely control the movement of all teeth. In actual tooth movement, various forms of movement such as angulation, rotation, and extrusion occur in a complex manner. On the other hand, attachments are designed for each individual movement, such as angulation, rotation, and extrusion, making it difficult to determine their position and direction according to the movement form.

DISCLOSURE

Technical Problem

One embodiment of the present invention proposes a clear alignment attachment design method and a clear alignment device, which notify whether an additional attachment needs to be adhered according to individual tooth movements during clear alignment and provide an adhered position of an aligner attachment if necessary, thereby improving the teeth-straightening speed and accuracy.

Technical Solution

A clear alignment attachment design method according to one embodiment include generating a tooth model of a patient, generating a setup model by moving tooth model to a target position according to a tooth movement plan, determining whether an additional attachment, in addition to clear aligners, needs to be placed for tooth movement from the tooth model to the setup model, and displaying, on individual teeth, the degree of attachment necessity using identifiable visual information according to a determination result.

The determining of whether an attachment needs to be placed may include defining an overlapping portion between the tooth model and the setup model as a corrective force area and determining whether an attachment needs to be placed using information including at least one of a position or a size of the defined corrective force area.

In the determining of whether an attachment needs to be placed, it may be determined that an attachment needs to be adhered when tooth movement is at least one of extrusion, angulation, or rotation.

In the displaying of the degree of attachment necessity on individual teeth using identifiable visual information, the degree of attachment necessity may be displayed using a color map with colors differentiating according to a deviation of an overlapping region between the tooth model and the setup model.

The clear alignment attachment design method may further include, when the attachment needs to be placed, differentiating and displaying a position of an attachment-needed area, to which a corrective force needs to be applied for tooth movement, using identifiable visual information.

In the differentiating and displaying of the position of the attachment-needed area, when at least two types of tooth movement are combined, the position of the attachment-needed area may be displayed using visual information that is distinct from other attachment-needed areas.

In the differentiating and displaying of the position of the attachment-needed area, for complex tooth movements, priorities may be assigned based on a tooth movement type, and adhered positions of attachments may be displayed according to the assigned priorities.

The clear alignment attachment design method may further include displaying information on an adhered direction of the attachment along with an adhered position of the attachment.

The clear alignment attachment design method may further include displaying a state after an attachment is adhered to a designated position using identifiable visual information.

The clear alignment attachment design method may further include providing a user interface for a user to modify at least one of an adhered position or an adhered direction of an attachment and modifying at least one of the adhered position or direction of the attachment by receiving a user operation signal through the user interface.

A clear alignment device according to another embodiment includes a control unit configured to generate a tooth model of a patient, generate a setup mode by moving the tooth model to a target position according to a tooth movement plan, and then determine whether an additional attachment, in addition to clear aligners, needs to be placed for tooth movement from the tooth model to the setup model and an output unit configured to display, on individual teeth, the degree of attachment necessity using identifiable visual information according to a determination result.

The control unit may define an overlapping portion between the tooth model and the setup model as a corrective force area and determine whether an attachment needs to be placed using information that includes at least one of a position or a size of the defined corrective force area.

The output unit may display a color map with colors differentiating according to a deviation of an overlapping region between the tooth model and the setup model.

When the attachment needs to be placed, the output unit may differentiate and display a position of an attachment-needed area, to which a corrective force needs to be applied for tooth movement, using identifiable visual information.

The output unit may display information on an adhered direction of the attachment along with the adhered position of the attachment.

Advantageous Effects

According to one embodiment, a clear aligner attachment design method and a clear alignment device determine whether an attachment is necessary for individual tooth movement, inform a position and a direction where a corrective force is required, and provide the attachment by applying such information to support precise control over individual teeth, thereby facilitating achieving effectively treatment outcomes that closely align with the planned dental conditions.

In addition, by using a color map to display whether necessary force is exerted to an appropriate position, treatment duration may be ultimately shortened based on the previous effective movement.

An attachment method for a limited form of attachments is effectively controlled to consider the individual movement of teeth, and not only the achievement of intended corrective force and treatment results but also the shortening of treatment duration is expected.

MODES OF THE INVENTION

The aspects and features of the present invention and methods for achieving the aspects and features will be apparent by referring to the example embodiments to be described in detail with reference to the accompanying drawings. However, the present invention is not limited to the example embodiments disclosed hereinafter, but can be implemented in various different forms. The example embodiments are merely provided so that the present invention is thorough and complete, and fully conveys the scope of the present invention to those skilled in the art, and the present invention is only defined within the scope of the appended claims. Throughout the entire specification, the same or like reference numerals designate the same or like elements.

In describing the example embodiments, a detailed description of related known configurations or functions incorporated herein will be omitted when it is determined that the detailed description thereof may unnecessarily obscure the subject matter of the present invention. The terms which will be described below are terms defined in consideration of the functions in the present invention, and may be different according to users, intentions of the users, or customs. Therefore, the definitions of the terms should be made based on the contents throughout the specification.

Combinations of blocks in the accompanying block diagrams or steps in the accompanying flowcharts can be executed by computer program instructions (execution engine), and the computer program instructions can be mounted in a processor of a general-use computer, special-use computer or other programmable data processing equipment. Thus, the instructions executed through the processor of the computer or other programmable data processing equipment generate units for performing functions described in the respective blocks of the block diagrams or the respective steps of the flowcharts.

The computer program instructions can be stored in a computer usable or readable memory oriented to a computer or other programmable data processing equipment, in order to implement functions in a specific method. Thus, the instructions stored in the computer usable or readable memory can be used to manufacture products including instruction units for performing the functions described in the respective blocks of the block diagrams or the respective steps of the flowcharts.

In addition, the computer program instructions can be mounted in the computer or other programmable data processing equipment. Therefore, instructions which generate processes by performing a series of operation steps on the computer or other programmable data processing equipment and operate the computer or other programmable data processing equipment can provide steps for executing the functions described in the respective blocks of the block diagrams and the respective steps of the flowcharts.

Further, each of the blocks or steps may indicate a part of a module, segment or code including one or more executable instructions for executing specific logical functions. In some substitutions, the functions described in the blocks or steps can be performed out of sequence. For example, two blocks or steps shown in succession may in fact be substantially executed at the same time, and the two blocks or steps may also be executed in the reverse order of the corresponding function as necessary.

Hereinafter, example embodiments of the present invention will be described in detail with reference to the accompanying drawings. However, the example embodiments may be modified in various different forms, and the scope of the present invention is not limited to the example embodiments described below. The example embodiments are provided to more completely describe the present invention to those skilled in the art.

Figure 1:
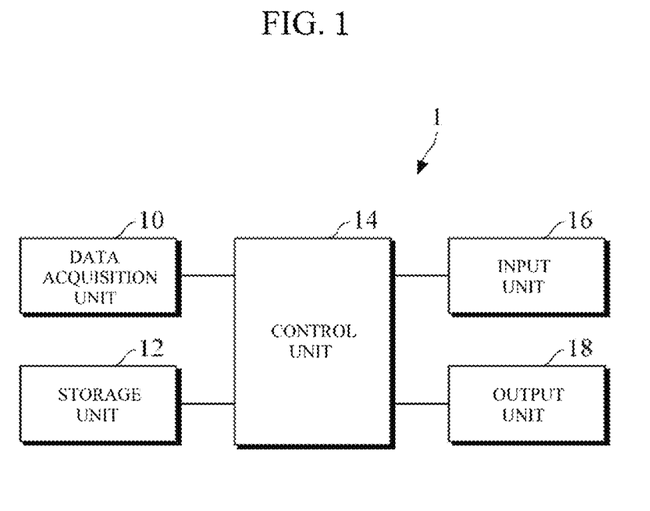
FIG. 1 is a diagram illustrating a configuration of a clear alignment device according to an embodiment of the present invention.

FIG. 1 is a diagram illustrating a configuration of a clear alignment device according to an embodiment of the present invention.

Dental correction methods include fixed orthodontics, in which brackets made of rigid materials such as metal, resin, or ceramic are attached to the teeth, and correction is carried out using the elasticity of wires; and removable orthodontics, which employs orthodontic devices that are easy to detach and have elasticity. The present invention relates to a clear alignment method, which is one of the removable orthodontic methods. The clear alignment method involves placing clear aligners made of transparent materials over the teeth. This not only makes the aligners invisible from the outside, but also provides the advantage of excellent wearability due to easy attachment and detachment of aligners.

The clear alignment method according to an embodiment includes preparing data, establishing a tooth movement plan, and fabricating aligners.

In the preparing of data, a clear alignment device 1 generates dental model data of a patient. The tooth model data may be created as 3D data representing the pre-treatment appearance of the patient's teeth and the surrounding area based on an oral scan model obtained by scanning the patient's tooth condition.

Subsequently, the clear alignment device 1 creates a setup model in the establishing of the tooth movement plan. The setup model refers to tooth arrangement data where teeth are moved ideally according to a treatment plan, established through orthodontic diagnosis and treatment planning from the tooth model, prior to orthodontic treatment.

Thereafter, the clear alignment device 1 fabricates clear aligners. For the fabrication of clear aligners, the clear alignment device includes a clear aligner design device and may additionally include a clear aligner fabrication device. There are two methods for producing clear aligners in the clear alignment method: direct fabrication and indirect fabrication. In the case of direct fabrication, the clear aligner design device directly produces the clear aligners without the need for a separate clear aligner fabrication device. In this case, the clear aligner design device creates and outputs an aligner model. In the case of indirect fabrication, when the clear aligner design device outputs a setup model, the clear aligner fabrication device produces the clear aligners through vacuum forming.

The clear aligner design device includes an electronic device capable of executing orthodontic design software. The electronic device may be a computer, a notebook computer, a laptop computer, a tablet PC, a smartphone, a cellular phone, a personal media player (PMP), a personal digital assistant (PDA), or the like. The clear aligner design device may output clear aligners using 3D printing methods, such as 3D printers, milling machines, and the like. The clear aligner fabrication device includes a base on which a tooth mold is provided, a forming sheet configured to cover the tooth mold, a heater configured to generate heat for heating the forming sheet, and a presser configured to press the forming sheet to cover the tooth mold.

Hereinafter, the configuration of the clear alignment device 1 will be described with reference to FIG. 1.

Referring to FIG. 1, the clear alignment device 1 according to an embodiment includes a data acquisition unit 10, a storage unit 12, a control unit 14, an input unit 16, and an output unit 18.

The data acquisition unit 10 acquires clinical data from an orthodontic treatment patient. The clinical data required for orthodontic treatment includes tooth model data representing tooth appearance, as well as additional data such as CT data, panoramic data, facial scan data, cephalometric X-ray data, posteroanterior (PA) X-ray data, and the like.

The storage unit 12 stores various data including information necessary for the operation of the clear alignment device 1, information generated during its operation, and the like. The storage unit 12 may provide data to the control unit 14 for data analysis by the control unit 14.

The control unit 14, through control by computer programs, diagnoses and analyzes the clinical data of the orthodontic treatment patient, and controls various components while performing data processing for the fabrication of clear aligners. In particular, the present invention provides technology for attaching an attachment further required in addition to clear aligners. For example, the control unit 14 determines whether an attachment needs to be adhered to each individual tooth and displays the degree of attachment necessity using identifiable visual information through the output unit 18. In this case, by selecting the tooth that requires an attachment and indicating the position and direction for attachment, it is possible to enable individualized movement control of the tooth, which cannot be achieved by clear aligners that cover the entire teeth. Additionally, by using a color map to indicate beforehand whether an intended appropriate force will be applied, a user may confirm if the attachment is properly adhered, and ultimately this leads to a reduction in treatment errors and consequently shortens the overall treatment duration. The control unit 14 may display the degree of attachment necessity in the form of a corrective force area or attachment-needed area, as will be described later.

To facilitate the fabrication of clear aligners and the control of placement of an attachment, the control unit 14 generates a tooth model from the clinical data of the patient acquired through the data acquisition unit 10. For example, using the tooth model data based on the current state of the patient's teeth, the control unit generates 3D data representing the pre-treatment appearance of the patient's teeth and the surrounding area. Subsequently, the generated tooth model is moved to its intended position according to the tooth movement plan to create a setup model. The setup model refers to virtual digital model data where the patient's tooth model, which deviates from a reference range, is arranged within a normal range.

The control unit 14 determines whether an additional attachment, in addition to the clear aligners, is required for tooth movement from the tooth model to the setup model, and configures screen information to differentiate and display, through the output unit 18, the determined degree of attachment necessity in the form of visual information. The visual information may be displayed using color differentiation, such as a color map, and may also be presented in various forms such as shapes, sizes, patterns, or even numerical values.

The purpose of using attachments is to provide a source of force when the clear aligners alone are not sufficient to apply the necessary corrective force to the teeth, thus supplementing the inadequate force. In other words, the need for attachments may be determined by assessing whether sufficient corrective force is being applied to the teeth for tooth movement. The force applied to the teeth may be confirmed by utilizing a color map obtained through the overlay of the teeth in their current state with the teeth in the planned setup state. The control unit 14 may identify a region within a tooth in the current state where a tooth in the setup state is positioned when the two tooth states are overlaid, and determine the identified region as a corrective force area where corrective force is to be applied to the tooth. The control unit 14 may display the corrective force area using a color map with a predetermined color through the output unit 18. The color may be set in advance and set by the user. Furthermore, if an attachment is needed, the control unit 14 may determine the position and direction for the attachment for tooth movement and display the position and direction through the output unit 18.

The output unit 18 displays a screen generated by the control unit 14. For example, the output unit 18 may display a screen showing the tooth model, setup model, and whether an attachment needs to be placed, a screen indicating the position and direction for an attachment if needed, and a screen showing a tooth status after placing the attachment.

For example, the output unit 18 may display the degree of attachment necessity as identifiable visual information on individual teeth. In this case, the degree of attachment necessity may be represented using a color map with colors differentiating based on the deviation of the overlapping region between the tooth model and the setup model.

When an attachment needs to be placed, the output unit 18 may differentiate and display the position of the attachment-needed area, to which corrective force needs to be applied for tooth movement, using identifiable visual information. In this case, when at least two types of tooth movement are combined, the position of the attachment-needed area may be displayed using visual information that is distinct from other attachment-needed areas. Furthermore, for complex tooth movements, priorities may be assigned based on the tooth movement type, and the adhered positions of attachments may be displayed according to the assigned priorities.

The output unit 18 may display information on an adhered direction of an attachment along with the adhered position of the attachment, and may also display the state after the attachment is adhered to a designated position using identifiable visual information.

The input unit 16 receives a user operation signal. For example, the output unit 18 may display a user interface for modifying at least one of the adhered position or direction of the attachment, and the input unit 16 may receive the user operation signal through the user interface. Based on the received user operation signal, the control unit 14 may modify at least one of the attachment position or direction.

Figure 2:
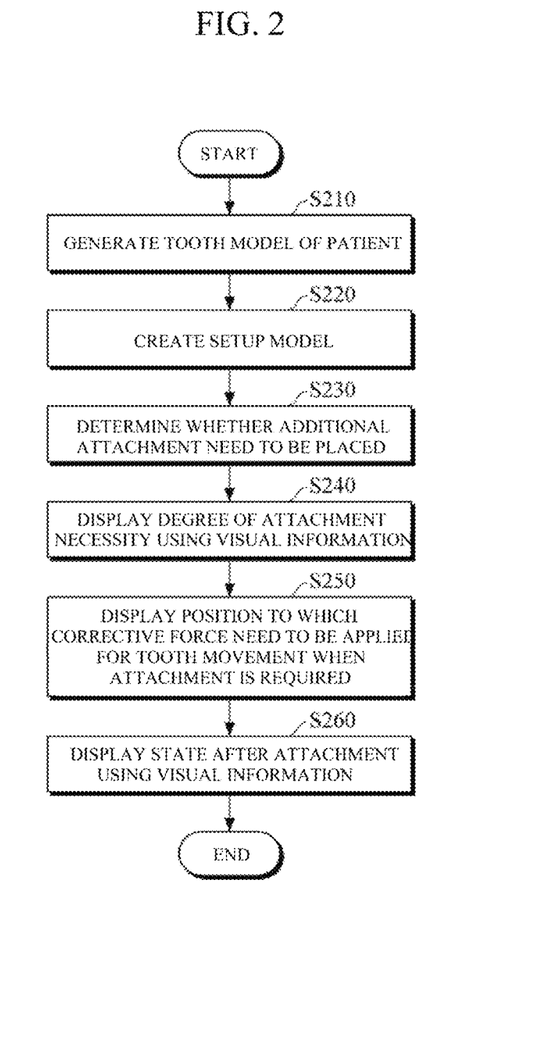
FIG. 2 is a flowchart illustrating a clear aligner attachment design method according to an embodiment of the present invention.

FIG. 2 is a flowchart illustrating a clear aligner attachment design method according to an embodiment of the present invention.

Referring to FIGS. 1 and 2, the clear alignment device 1 generates a patient's tooth model (S210) and creates a setup model by moving the tooth model to a target position according to a tooth movement plan (S220).

Subsequently, the clear alignment device 1 determines whether an additional attachment, in addition to clear aligners, needs to be placed for tooth movement from the tooth model to the setup model (S230). For example, by defining the overlapping portion between the tooth model and the setup model as a corrective force area and whether an attachment needs to be placed may be determined using information that includes at least one of the position or the size of the defined corrective force area.

In the determining of whether an attachment is required (S230), when tooth movement corresponds to at least one of extrusion, angulation, or rotation, the clear alignment device 1 may determine that the attachment needs to be placed. An embodiment thereof will be described below with reference to FIG. 7.

Figure 3:
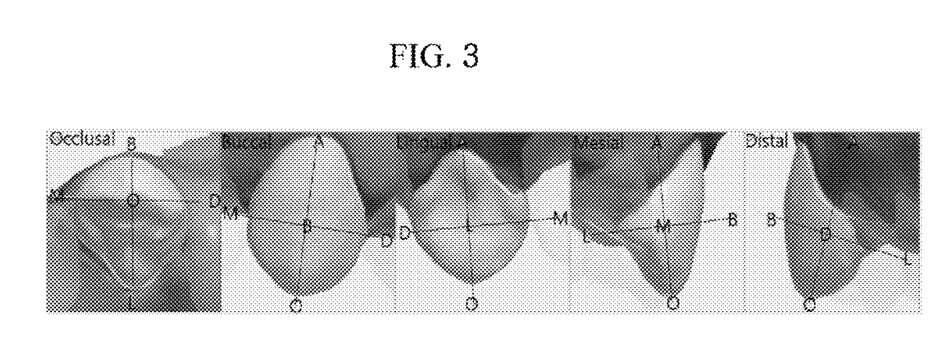
FIG. 3 is a diagram illustrating a color map image screen when an attachment does not need to be placed according to an embodiment of the present invention.
Figure 4:
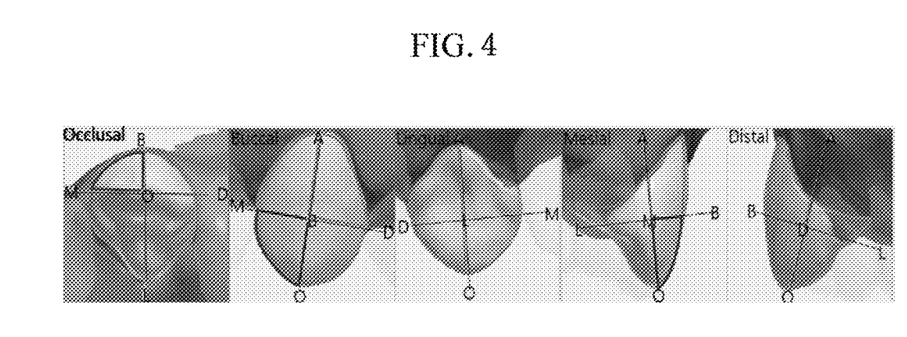
FIG. 4 is a diagram illustrating a color map image screen when an attachment needs to be placed according to an embodiment of the present invention.

Subsequently, the clear alignment device 1 displays the degree of attachment necessity as identifiable visual information on individual teeth based on a determination result (S240). In this case, the clear alignment device 1 may display the degree of attachment necessity in the form of a corrective force area or an attachment-needed area. For example, the degree of attachment necessity may be displayed using a color map with colors differentiating based on the deviation of the overlapping region between the tooth model and the setup model. FIG. 3, which will be described below, illustrates an image screen displaying a color map when an attachment is unnecessary, and FIG. 4 illustrates an image screen displaying a color map when an attachment is required.

When an attachment needs to be placed, the clear alignment device 1 may differentiate and display the position of the attachment-needed area, to which corrective force needs to be applied for tooth movement, as distinguishable visual information (S250). Information on an adhered direction of the attachment may also be displayed along with the adhered position of the attachment.

When at least two types of tooth movement are combined, the position of the attachment-needed area may be displayed using visual information that is distinct from other attachment-needed areas. For example, in this case, a region involving rotation in addition to translation or a region involving a different rotation may be highlighted with a more emphasized color (e.g., red) for differentiation.

During complex tooth movement, priorities may be assigned based on the tooth movement type, and the adhered positions of attachments may be displayed according to the assigned priorities. For example, the adhered positions of attachments may be displayed with priority given in the order of extrusion>angulation>rotation, corresponding to varying levels of difficulty in movement.

The clear alignment device 1 may provide a user interface for the user to modify at least one of the adhered position or direction of an attachment, and may modify at least one of the position or direction of an attachment by receiving a user operation signal through the user interface.

Furthermore, the clear alignment device 1 may display the state after the attachment is adhered to the designated position using identifiable visual information (S260). In this case, the user may verify whether the attachment has been appropriately placed.

FIG. 3 is a diagram illustrating a color map image screen when an attachment is unnecessary according to an embodiment of the present invention.

Referring to FIGS. 1 and 3, the clear alignment device 1 differentiates and displays whether an attachment needs to be placed using visual information. FIG. 3 illustrates a screen displaying a case where an attachment does not need to be placed using a color map.

The clear alignment device 1 may display views of individual teeth from various directions to indicate whether an attachment needs to be placed. For example, as shown in FIG. 3, the clear alignment device may display the tooth status from five views: occlusal, buccal, lingual, mesial, and distal, and then divide each view into four quadrants based on the mesial (M)/distal (D), buccal (B)/lingual (L) and cervical (C)/occlusal (O) directions, allowing the positioning to be indicated.

The color map is displayed on a screen with colors that are differentiated based on the degree of deviation of the overlapping region when the initial tooth state of the patient is overlaid with the tooth state in the setup stage. Colors may be set in advance and be set by the user. A region within a tooth in the current state where a tooth in the setup state is positioned when the two tooth states are overlaid may be determined as a corrective force area where corrective force is to be applied to the tooth, and the corrective force area may be displayed using a color map with a predetermined color. The color may be set in advance and set by the user.

Based on the position and size of the corrective force area displayed by the color map, the clear alignment device 1 may determine whether an additional attachment needs to be placed. For example, assuming a tooth movement state is buccal translation as shown in FIG. 3, if the corrective force area displayed using a color map, when the teeth in the current state is overlaid with the teeth in the setup state, is positioned mainly in the lingual direction, which is required for movement in a buccal direction, occupying more than half of the area at an appropriate intensity, the clear alignment device may determine that sufficient corrective force is being applied for tooth movement through the use of clear aligners alone, rendering the attachment unnecessary.

FIG. 4 is a diagram illustrating a color map image screen when an attachment needs to be placed according to an embodiment of the present invention.

Referring to FIGS. 1 and 4, assuming a tooth movement state is mesial direction rotation, if the corrective force area displayed using a color map, when the teeth in the current state is overlaid with the teeth in the setup state, is not positioned in the mesio-buccal and disto-lingual directions, which are required for movement in a rotation movement, and occupies a very small area, the clear alignment device may determine that an attachment needs to be placed.

The types of tooth movement that can determine the need for an attachment based on whether there is a lack of points of application where corrective force is generated within clear aligners will be described below with reference to FIG. 7.

Figure 5:
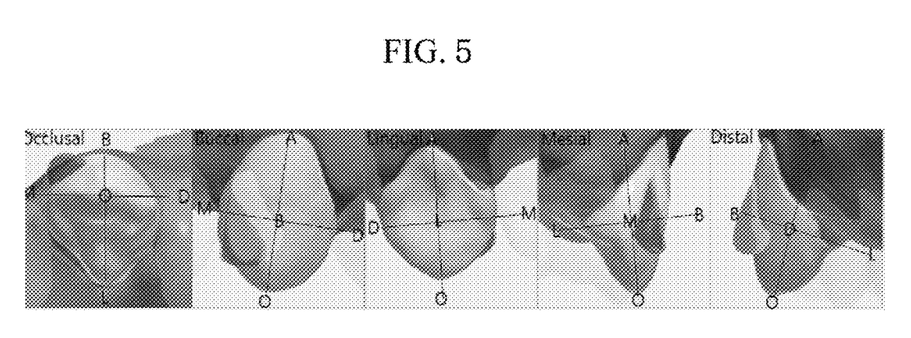
FIG. 5 is a diagram illustrating an image screen providing information on a position where an attachment needs to be placed according to an embodiment of the present invention.

FIG. 5 is a diagram showing an image screen providing information on a position where an attachment needs to be placed according to an embodiment of the present invention.

Referring to FIGS. 1 and 5, the clear alignment device 1 attaches an attachment to a corrective force area where corrective force is to be applied based on a direction in which teeth are to move. For example, if corrective forces are needed from the mesio-buccal and disto-lingual directions of the tooth for a mesial rotation movement, these locations are differentiated and displayed using visual information (e.g., color), as shown in FIG. 5. The display color may be set in advance, and arbitrarily set by the user.

The clear alignment device 1 may differentiate and display colors according to the method of tooth movement. For example, rotation and translation may be displayed using distinct colors. As teeth often undergo complex movements involving simultaneous multiple movements rather than a single-direction movement, the movements may be differentiated and displayed accordingly. In this case, areas undergoing translation other than rotation or undergoing different rotation may be highlighted using a more emphasized color (e.g., red) for differentiation. Placing attachments in the emphasized areas may supplement complex corrective force without changing the positions during movement.

In addition, during complex tooth movements, attachment positions may be displayed with priority given in the order of extrusion>angulation>rotation, corresponding to varying levels of difficulty in movement.

The clear alignment device 1 may provide direction information as well as the attachment position. For example, an attachment is adhered with its bevel aligned with the direction of tooth movement based on the position where the attachment needs to be adhered. This is to allow the generated corrective force to initially restrain from the bevel, while sustaining that force over time. It also serves to limit the area where the tooth will move on the opposite cutting side (perpendicular side). The direction information may be presented through a user interface such as an arrow or the like.

Figure 6:
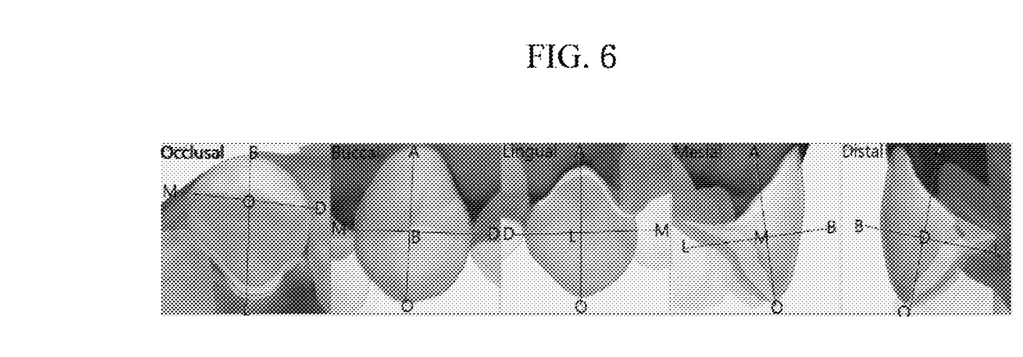
FIG. 6 is a diagram illustrating a color map image screen showing a state after an attachment is placed according to an embodiment of the present invention.

FIG. 6 is a diagram illustrating a color map image screen showing a state after an attachment is placed according to an embodiment of the present invention.

Referring to FIGS. 1 and 6, after an attachment is placed, similar to the initial state, tooth state may be displayed using visual information such as a color map, allowing the user to confirm whether the attachment is appropriately placed and sufficient corrective force is secured.

Figure 7:
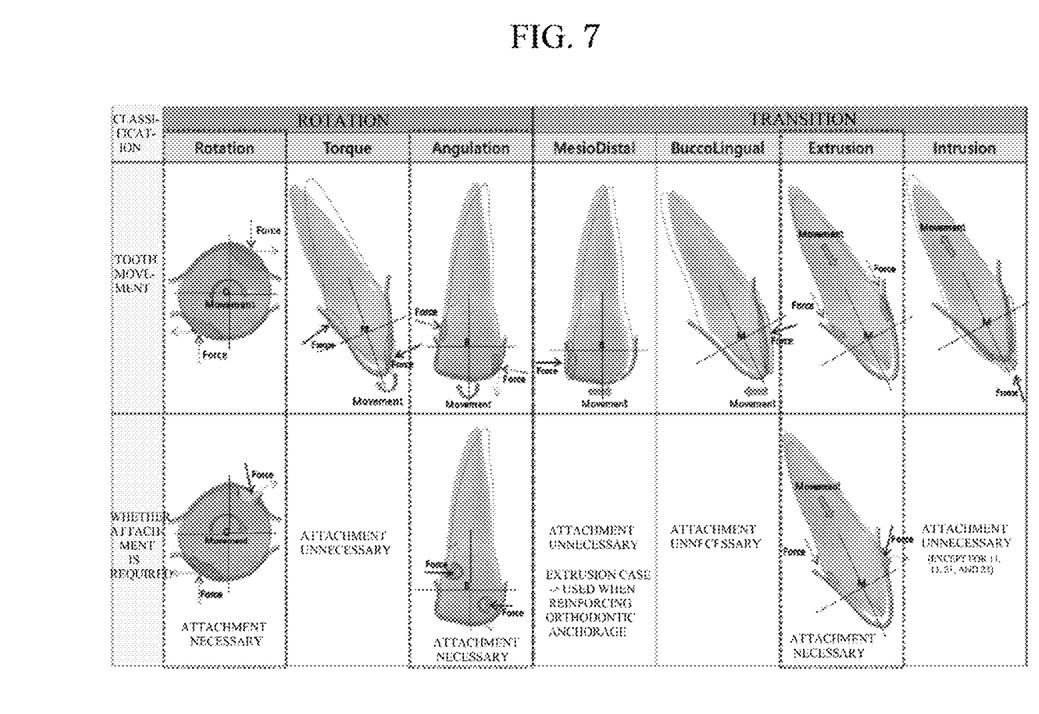
FIG. 7 is a diagram illustrating an attachment usage table for each tooth movement according to an embodiment of the present invention.

FIG. 7 is a diagram illustrating an attachment usage table for each tooth movement according to an embodiment of the present invention.

Referring to FIGS. 1 and 7, types of tooth movement may be categorized into rotational movements (rotation, torque, and angulation) and translational movements (mesio-distal, bucco-lingual, extrusion, and intrusion). For extrusion, angulation, and rotation movements, where there is insufficient force, the attachment is necessary.

Therefore, the clear alignment device 1 may determine that an attachment needs to be placed when the tooth movement is at least one of extrusion, angulation, or rotation.

In addition, during mesio-distal movement, the clear alignment device 1 may determine that an additional anchor attachment is required in specific cases, such as extraction cases, to serve as an orthodontic anchorage. Additionally, the clear alignment device 1 may determine that an additional anchor attachment is also required for specific teeth (e.g., teeth numbered 11, 13, 21, and 23) during intrusion movement.

Heretofore, the present invention has been described by focusing on the exemplary embodiments. It can be understood by those skilled in the art to which the present invention pertains that the present invention can be implemented in modified forms without departing from the essential feature of the present invention. Therefore, the disclosed embodiments should be considered as illustrative rather than determinative. The scope of the present invention is defined by the appended claims rather than by the foregoing description, and all differences within the scope of equivalents thereof should be construed as being included in the present invention.

The invention claimed is:

1. A clear alignment attachment design method comprising:
generating, by a processor configured for three-dimensional dental modeling, a three-dimensional tooth model of a patient from intraoral scan data;
generating, by the processor, a three-dimensional setup model by moving the tooth model to a target position according to a tooth movement plan;
determining, by the processor using a corrective-force analysis algorithm applied to the three-dimensional models, whether an additional attachment, in addition to clear aligners, needs to be placed for tooth movement from the tooth model to the setup model; and
controlling a display device to render, on individual teeth with a three-dimensional visualization, the degree of attachment necessity using identifiable visual information according to a determination result, wherein the identifiable visual information is automatically computed based on deviation analysis between the three-dimensional tooth model and the setup model.

2. The clear alignment attachment design method of claim 1, wherein the determining of whether an attachment needs to be placed comprises:
defining an overlapping portion between the tooth model and the setup model as a corrective force area; and determining whether an attachment needs to be placed using information including at least one of a position or a size of the defined corrective force area.

3. The clear alignment attachment design method of claim 1, wherein in the determining of whether an attachment needs to be placed, it is determined that an attachment needs to be adhered when tooth movement is at least one of extrusion, angulation, or rotation.

4. The clear alignment attachment design method of claim 1, wherein in the displaying of the degree of attachment necessity on individual teeth using identifiable visual information, the degree of attachment necessity is displayed using a color map with colors differentiating according to a deviation of an overlapping region between the tooth model and the setup model.

5. The clear alignment attachment design method of claim 1, further comprising:
when the attachment needs to be placed, differentiating and displaying a position of an attachment-needed area, to which a corrective force needs to be applied for tooth movement, using identifiable visual information.

6. The clear alignment attachment design method of claim 5, wherein in the differentiating and displaying of the position of the attachment-needed area, when at least two types of tooth movement are combined, the position of the attachment-needed area is displayed using visual information that is distinct from other attachment-needed areas.

7. The clear alignment attachment design method of claim 5, wherein in the differentiating and displaying of the position of the attachment-needed area, for complex tooth movements, priorities are assigned based on a tooth movement type, and adhered positions of attachments are displayed according to the assigned priorities.

8. The clear alignment attachment design method of claim 5, further comprising displaying information on an adhered direction of the attachment along with an adhered position of the attachment.

9. The clear alignment attachment design method of claim 1, further comprising displaying a state after an attachment is adhered to a designated position using identifiable visual information.

10. The clear alignment attachment design method of claim 1, further comprising:
providing a user interface for a user to modify at least one of an adhered position or an adhered direction of an attachment; and
modifying at least one of the adhered position or direction of the attachment by receiving a user operation signal through the user interface.

11. A clear alignment device comprising:
a control unit including a processor programmed to:
generate a three-dimensional tooth model of a patient from intraoral scan data,
generate a three-dimensional setup model by moving the tooth model to a target position according to a tooth movement plan, and
determine whether an additional attachment, in addition to clear aligners, needs to be placed for tooth movement from the tooth model to the setup model by applying a corrective-force area calculation to three-dimensional model data; and
an output unit configured to display, on a three-dimensional interface, individual teeth with a degree of attachment necessity using identifiable visual information automatically computed from a deviation analysis between the three-dimensional tooth model and the setup model.

12. The clear alignment device of claim 11, wherein the control unit is configured to define an overlapping portion between the tooth model and the setup model as a corrective force area and determine whether an attachment needs to be placed using information that includes at least one of a position or a size of the defined corrective force area.

13. The clear alignment device of claim 11, wherein the output unit is configured to display a color map with colors differentiating according to a deviation of an overlapping region between the tooth model and the setup model.

14. The clear alignment device of claim 11, wherein when the attachment needs to be placed the output unit is configured to differentiate and display a position of an attachment-needed area, to which a corrective force needs to be applied for tooth movement, using identifiable visual information.

15. The clear alignment device of claim 14, wherein the output unit is configured to display information on an adhered direction of the attachment along with the adhered position of the attachment.

* * * * *